US006266190B1

(12) United States Patent
Hirunuma et al.

(10) Patent No.: US 6,266,190 B1
(45) Date of Patent: Jul. 24, 2001

(54) OPTICAL DEVICE PROVIDED WITH CORRECTING FUNCTION FOR TREMBLING OF FOCUSED IMAGE

(75) Inventors: Ken Hirunuma, Tokyo; Shinji Tsukamoto, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/318,826

(22) Filed: May 26, 1999

(30) Foreign Application Priority Data

May 26, 1998 (JP) .................................... 10-144386

(51) Int. Cl.[7] .................................... G02B 27/64
(52) U.S. Cl. .................. 359/557; 359/554; 359/407; 396/55
(58) Field of Search .................... 359/407–409, 359/480–482, 554–557, 813–814, 823–824, 694–706; 396/52–55; 348/208

(56) References Cited

U.S. PATENT DOCUMENTS

| 4,780,739 | * | 10/1988 | Kawakami et al. ............. 396/54 |
| 4,936,664 | | 6/1990 | Haraguchi et al. ............. 359/694 |
| 4,970,540 | | 11/1990 | Vasey et al. .................. 396/54 |
| 5,305,040 | | 4/1994 | Enomoto ...................... 396/55 |
| 5,461,513 | | 10/1995 | Maruyama .................... 359/837 |
| 5,602,675 | * | 2/1997 | Okada ......................... 359/554 |
| 5,754,339 | | 5/1998 | Kanai et al. .................. 359/557 |
| 5,822,122 | * | 10/1998 | Kuno et al. ................... 396/52 |
| 5,831,671 | | 11/1998 | Chigira et al. ................ 348/208 |
| 5,883,742 | * | 3/1999 | Kamata ....................... 359/557 |
| 5,917,653 | * | 6/1999 | Taniguchi .................... 359/557 |
| 6,043,934 | * | 3/2000 | Hirunuma et al. ............. 359/557 |

FOREIGN PATENT DOCUMENTS

| 6-43365 | 2/1994 | (JP) . |
| 6308431 | 11/1994 | (JP) . |
| 10-20213 | 1/1998 | (JP) . |
| 10186228 | 7/1998 | (JP) . |

* cited by examiner

*Primary Examiner*—Thong Nguyen
(74) *Attorney, Agent, or Firm*—Greenblum & Bernstein P.L.C.

(57) ABSTRACT

A lengthwise-direction driving frame is supported in an opening of a flange by holding members, being slidable in a lengthwise direction. The opening of the flange includes inner walls parallel to the lengthwise direction. A lateral-direction driving frame, which holds correction lenses, is supported in an opening of the lengthwise-direction driving frame, being slidable in a lateral direction. The opening of the lengthwise-direction driving frame includes inner walls parallel to the lateral direction. A tip of a shaft of a lengthwise-direction actuator abuts at all times against a pressed member which is fixed on the lengthwise-direction driving frame. A tip of a shaft of a lateral-direction actuator abuts at all times against a pressed member which is fixed on the lateral-direction driving frame. The lengthwise-direction and lateral-direction actuators are respectively fixed on the flange.

18 Claims, 7 Drawing Sheets

OPTICAL DEVICE PROVIDED WITH CORRECTING FUNCTION FOR TREMBLING OF FOCUSED IMAGE

BACKGROUND OF THE INVENTION

1. Field of the Invention

The present invention relates to an optical device, for example, a pair of binoculars, which is provided with a tremble preventing apparatus.

2. Description of the Related Art

Conventionally, an optical device, for example, binoculars, is provided with a tremble preventing apparatus which corrects a tremble of a focused image due to a hand tremble and so on. The tremble preventing apparatus includes correcting optical systems. The correction optical systems are driven two-dimensionally in a plane perpendicular to an optical axis of the optical device, such that a movement of the optical device is canceled.

The correcting optical systems are moved along two axes which are perpendicular to the above-mentioned plane. Namely, it is necessary to mount respectively at least two driving devices for the two axes. However, the mount required for a plurality of the driving devices causes an enlargement in a size of the correcting apparatus, which in turn renders miniaturization, which is recently required of optical devices, difficult.

SUMMARY OF THE INVENTION

Therefore, an object of the present invention is to provide a compact tremble preventing apparatus.

In accordance with an aspect of the present invention, there is provided an optical device provided with a tremble preventing function comprising: a first driving frame in which an opening is formed, the first driving frame being slidably held by a fixing frame formed on an inner wall of the optical device; a second driving frame that holds correcting optical systems that correct a tremble of a focused image of the optical device, the second driving frame being slidably held in the opening; a first driving mechanism that drives the first driving frame along a first axis on a plane vertical to an optical axis of the optical device; and a second driving mechanism that drives the second driving frame along a second axis perpendicular to the first axis on the plane.

At least one portion of the fixing frame that contacts the first driving frame, has a liner portion parallel to the first axis. At least one portion of the first driving frame that contacts the second driving frame has a liner portion parallel to the second axis. The first driving frame is driven by the first driving mechanism, being led by the linear portion parallel to the first axis. The second driving frame is driven by the second driving mechanism, being led by the linear portion parallel to the second axis.

The first driving frame and the second driving frame are made of a resin material having a low coefficient of friction.

Preferably, the first driving mechanism and the second driving mechanism are fixed on the fixing frame.

Preferably, the first driving mechanism is fixed on the fixing frame, and the second driving mechanism is fixed on the first driving frame.

The optical device further comprises: first urging members that urge the first driving frame such that the first driving frame contacts the linear portion parallel to the first axis at all times; and second urging members that urge the second driving frame such that the second driving frame contacts the linear portion parallel to the second axis at all times. The first urging members and the second urging members are coil springs.

The optical device further comprises first holding members and second holding members. Each of the first holding members includes a first screw, a first nut and a first pair of washers. The first screw is received in the fixing frame along the optical axis. The first nut is threadingly engaged on a free end of the first screw, opposite a head of the first screw. A first washer of the first pair of washers is mounted between the head of the first screw and the fixing frame, and a second washer of the first pair of washers is mounted between the first nut and the fixing frame. Each of the second holding members includes a second screw, a second nut and a second pair of washers. The second screw is received in the first driving frame along the optical axis. The second nut is threadingly engaged on a free end of the second screw, opposite a head of the second screw. A first washer of the second pair of washers is mounted between the head of the second screw and the first driving frame, and a second washer of the second pair of washers is mounted between the second nut and the first driving frame. Perimeters of the first pair of washers clamp perimeter portions of the first driving frame, so that the first driving frame is held by the fixing frame, with movement of the first driving frame along the optical axis being restrained, and perimeters of the second pair of washers clamp perimeter portions of the second driving frame, so that the second driving frame is held in the opening, with movement of the second driving frame along the optical axis being restrained.

A thickness of the fixing frame along the optical axis is larger than a thickness of the first driving frame along the optical axis, and a thickness of the first driving frame along the optical axis is larger than a thickness of the second driving frame along the optical axis.

A difference between the thickness of the fixing frame and the thickness of the first driving frame is small, such that a movement of the first driving frame along the first axis is unaffected by friction between the first pair of washers and the first driving frame, and the movement of the first driving frame along the optical axis is negligible. A difference between the thickness of the first driving frame and the thickness of the second driving frame is small, such that a movement of the second driving frame along the second axis is unaffected by friction between the second pair of washers and the second driving frame, and the movement of the second driving frame along the optical axis is negligible.

The fixing frame is a flange unitarily formed on the inner wall of the optical device.

Further, In accordance with another aspect of the present invention, there is provided an optical device provided with a tremble preventing function comprising: a first driving frame in which an opening is formed, the first driving frame being slidably held by a fixing frame formed on an inner wall of the optical device; a second driving frame that holds correcting optical systems for correcting a tremble of a focused image of the optical device, the second driving frame being slidably held in the opening; and a driving mechanism that independently drives each of the first driving frame and the second driving frame. The fixing frame includes first leading members that lead the first driving frame in a first direction on a plane perpendicular to an optical axis of the optical device, and the first driving frame includes second leading members that lead the second driving frame in a second direction perpendicular to the first direction, on the plane.

A thickness of the first driving frame along the optical axis is shorter than a thickness of the fixing frame along the optical axis. The first leading members is disposed on planes that include both side surfaces of the fixing frame and are perpendicular to the optical axis, and each of the first leading members is disposed close to the first driving frame, such that one portion of each of the first leadings member overlaps the first driving frame.

Each of the first leading members includes a pair of washers. The pair of washers is disposed on the planes such that the fixing frame is partially interposed between the pair of washers and a portion of the pair of washers overlaps the first driving frame.

A difference between the fixing frame and the first driving member is small, such that a movement of the first driving frame in the first direction is unaffected by friction between the pair of washers and the first driving frame, and a movement of the first driving frame along the optical axis is negligible.

A thickness of the second driving frame along the optical axis is shorter than a thickness of the first driving frame along the optical axis. The second leading members are disposed on planes that include both side surfaces of the first driving frame and are perpendicular to the optical axis, and each of the second leading members is disposed close to the opening, such that one portion of each of the second leading members overlaps the opening.

Each of the second leading members includes a pair of washers. The pair of washers is disposed on the planes such that the first driving frame is partially interposed between the pair of washers and one portion of the pair of washers overlaps the opening.

A difference between the thickness of the first driving frame and the thickness of the second driving frame is small, such that a movement of the second driving frame in the second direction is unaffected by friction between the pair of washers and the second driving frame, and a movement of the second driving frame along the optical axis is negligible.

DESCRIPTION OF THE PREFERRED EMBODIMENTS

The present invention will now be described with reference to embodiments shown in the drawings.

Figure 1:
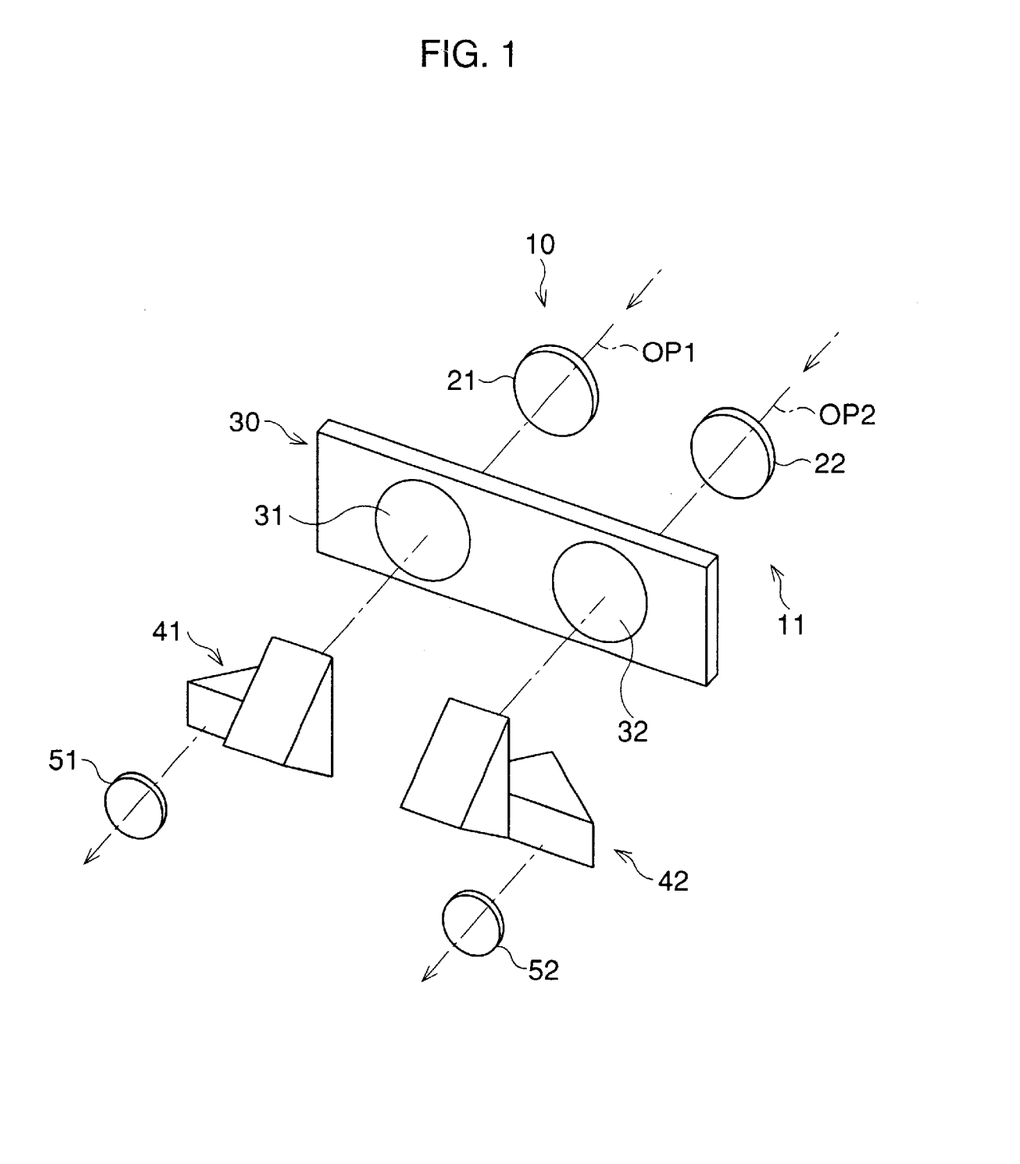
FIG. 1 is a conceptional view showing relational positions of optical systems of binoculars to which a first embodiment according to the present invention is applied.

FIG. 1 is a conceptional view showing relational positions of optical systems of binoculars to which a first embodiment, according to the present invention, is applied. In a first optical system 10, after passing through a first objective lens 21 and a first correction lens 31, reflected light from an object is directed to a first eyepiece 51 through a first erecting prism 41. In a second optical system 11, after passing through a second objective lens 22 and a second correction lens 32, the reflected light is directed to a second eyepiece 52 through a second erecting prism 42.

The first and second correction lenses 31 and 32 are unitarily supported by a lens supporting frame 30. The relational position between each element of the first and second optical systems 10 and 11 is adjusted, such that an optical axis OP1 of the first optical system 10 and an optical axis OP2 of the second optical system 11 are aligned in parallel.

Note that, in this specification, a "lateral direction" means a direction parallel to a standard plane on which the optical axes OP1 and OP2 lie, being perpendicular to the optical axes OP1 and OP2, and a "lengthwise direction" means a direction perpendicular to the standard plane. Namely, while the binoculars are held in a standard position, the lateral direction corresponds to a horizontal direction and the lengthwise-direction corresponds to a vertical direction.

Figure 2:
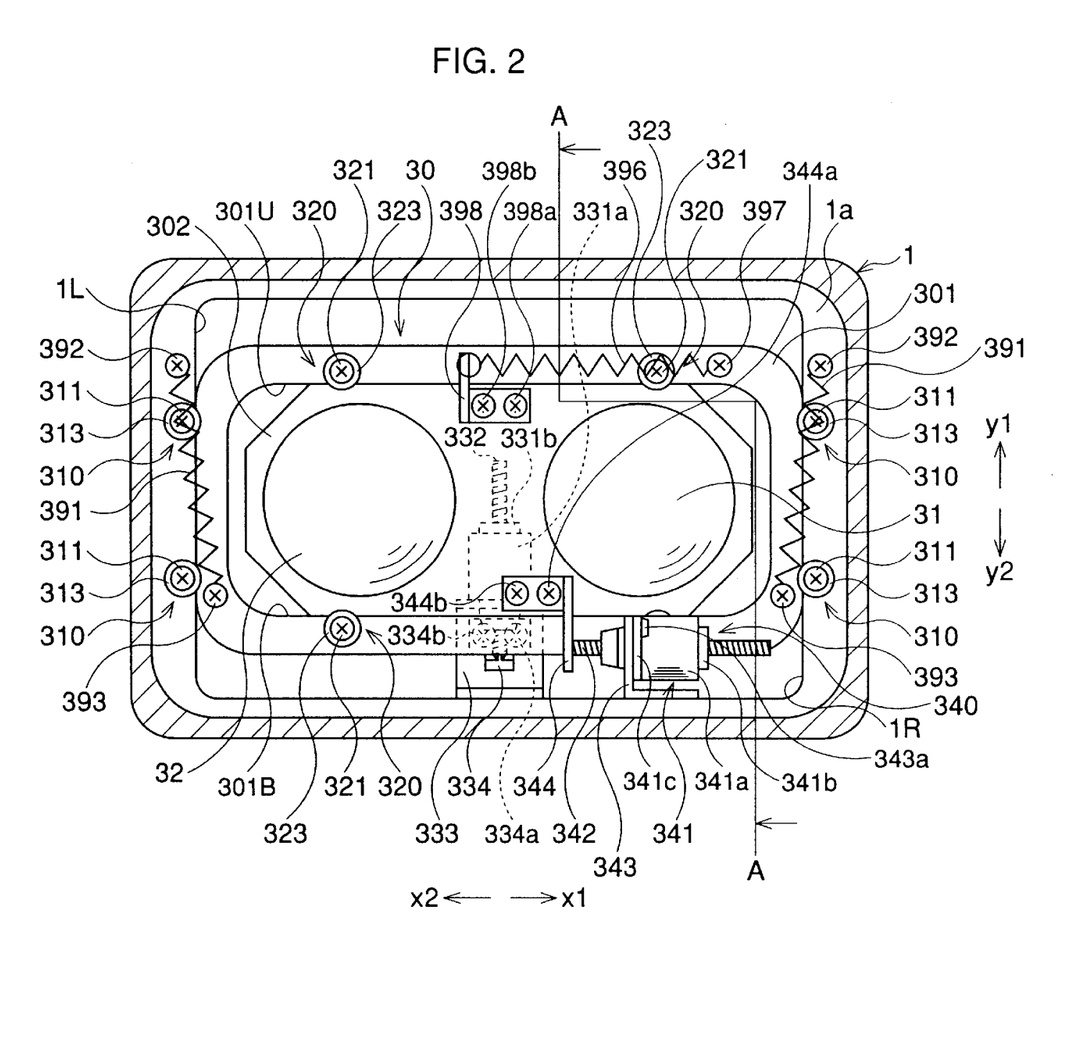
FIG. 2 is a front view of a lens supporting frame of the first embodiment.

FIG. 2 is a front view of the lens supporting frame 30, viewed from the side of the first and second objective lenses 21 and 22. In FIG. 2, some members are phantom drawn, in order to facilitate explanation of the construction of the lens supporting frame 30.

The lens supporting frame 30 includes a lengthwise-direction driving frame 301 and a lateral-direction driving frame 302. The lengthwise-direction driving frame 301 is a flat board. A through-hole opening is formed in a center of the driving frame 301. Namely, the driving frame 301 is a doughnut-shaped board. The driving frame 301 is supported by holding members 310 mounted on a flange 1a, which is unitarily formed on an inner wall 1 of the binoculars, to be slidable in the lengthwise direction so that the driving frame 301, when driven, is led in the lengthwise direction.

The driving frame 302 is a flat board which unitarily holds the correction lenses 31 and 32, and is disposed in the through-hole opening of the driving frame 301. The driving frame 302 is supported by holding members 320 mounted on the driving frame 301, and is slidable in the lateral direction so that the driving frame 302, when driven, is led in the lateral direction.

The through-hole opening of the driving frame 301 is formed in such a manner that inner walls 301B and 301U are parallel to the lateral direction. Further, the driving frames 301 and 302 are made of a resin material, which has a low coefficient of friction.

Figure 3:
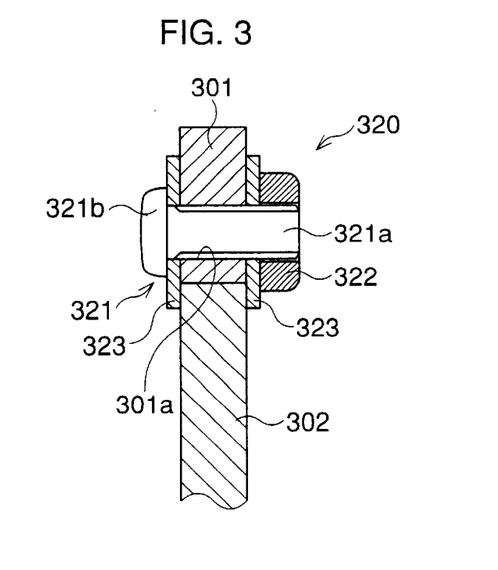
FIG. 3 is an enlarged sectional side view of a holding member.

FIG. 3 is a sectional side view of the holding member 320. The holding member 320 comprises a screw 321, a nut 322 and a pair of washers 323. A shaft 321a of the screw 321 is received in a hole 301a formed in the lengthwise-direction driving frame 301. A thread is formed on the shaft 321a. The nut 322 is threadingly engaged on a free end of the shaft 321a, opposite a head 321b of the screw 321. One washer 323 is mounted between the head 321b and the driving frame 301, and another washer 323 is mounted between the nut 322 and the driving frame 301.

The radii of the washers 323 are greater than the length between a side surface of the driving frame 301, which is in contact with the side surface of the lateral-direction driving frame 302 and a longitudinal central axis of the shaft 321a.

In other words, the pair of washers 323 are respectively disposed on planes that include both side surfaces of the driving frame 301 and are perpendicular to the optical axes OP1 and OP2. Each washers 323 is disposed close to the driving frame 302, in such a manner that one portion of each washer 323 overlaps the driving frame 302. Namely, a perimeter portion of the driving frame 302 is lightly clamped by the pair of the washers 323, so that the frame 302 is partially interposed between the pair of washers 323. Accordingly, movement of the driving frame 302 parallel to the optical axes OP1 and OP2 is restrained, being led in the lateral direction when driven.

The holding member 310 (see FIG. 2) has a similar construction to that of the holding member 320. A shaft of a screw 311 is received in a hole formed in the flange 1a, and a nut (omitted in FIG. 2) is threadingly engaged on a free end of the shaft, opposite a head of the screw 311. One washer 313 (see FIG. 2) is mounted between the head of the screw 311 and the flange 1a, and another washer (not shown) is mounted between the nut and the flange 1a. A perimeter of the lengthwise-direction driving frame 301 is lightly clamped by the washers 313.

In other words, the pair of washers 313 are respectively disposed on planes that include both side surfaces of the flange 1aand are perpendicular to the optical axes OP1 and OP2. Each washers 313 is disposed close to the driving frame 301, in such a manner that one portion of each washer 313 overlaps the driving frame 301. Namely, similarly to the lateral-direction driving frame 302, the lengthwise-direction driving frame 301 is held by the pair of washers 313 so as not to move in a direction parallel to the optical axes OP1 and OP2.

Consequently, a perimeter portion of the driving frame 301 is lightly clamped by the pair of washers 313, so that the frame 301 is partially interposed between the pair of washers 313. Accordingly, the driving frame 301 is unable to move in the direction parallel to the optical axes OP1 and OP2, being led in the lengthwise direction when driven.

The perimeter of the lengthwise-direction driving frame 301, mounted in the flange 1a, is lightly clamped by the pair of washers 313 of the holding member 310, with the perimeter portion of the driving frame 302, mounted in the opening of the frame 301, being lightly clamped by the pair of the washers 323 of the holding member 320. Namely, the flange 1a and the frames 301, 302 are formed so that the thickness of the flange 1a, along the optical axes OP1 and OP2, is larger than the thickness of the frame 301, along the optical axes OP1, OP2, and the thickness of the frame 301 is larger than the thickness of the frame 302, along the optical axes OP1 and OP2.

Further, a difference between the thickness of the flange 1aand the thickness of the driving frame 301 is small, such that the movement of the driving frame 301 in the lengthwise direction is unaffected by friction between the pair of washers 313 and the driving frame 301, and the movement of the driving frame 301 parallel to the optical axes OP1 and OP2 is negligible.

Furthermore, a difference between the thickness of the driving frame 301 and the thickness of the driving frame 302 is small, such that the movement of the driving frame 302 in the lateral direction is uneffected by friction between the pair of washers 323 and the driving frame 302, and the movement of the driving frame 302 parallel to the optical axes OP1, 0P2 is negligible.

Figure 4:
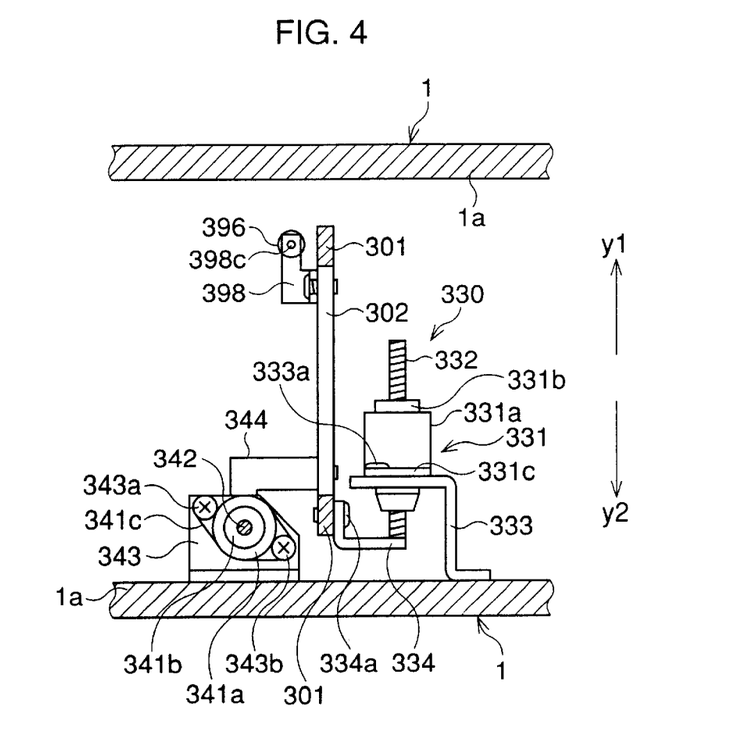
FIG. 4 is a sectional side view of the lens supporting frame of the first embodiment.

FIG. 4 is a sectional side view taken in the direction of the arrows substantially along the line A—A of FIG. 2. Actuators of the first embodiment will be explained, with reference to FIGS. 2 and 4.

A lengthwise-direction actuator, generally indicated by reference 330, is placed at a center portion of the driving frames 301 and 302, on a side of the first and second erecting prisms 41 and 42 (see FIG. 1). The lengthwise-direction actuator 330 comprises a stepping motor 331 and a shaft 332. The stepping motor 331 comprises a motor case 331a and a motor 331b which is mounted in the motor case 331a.

The motor 331b can rotate in forward and reverse directions around a lengthwise direction axis. The shaft 332 is supported so as to be unitarily rotatable with the rotational movement of the motor 331b and movable along the longitudinal axis thereof. Threads are formed on the outer surface of the shaft 332, and the shaft 332 is engaged with a female thread (omitted in FIGS. 2 and 4) formed on the inner surface of a quill of the motor case 331a. Namely, the shaft 332 rotatably extends or retracts in the longitudinal direction, in accordance with the rotational direction, forward and reverse, of the motor 331b. A bowl is mounted on the tip of the shaft 332. The bowl of the shaft 332 abuts a pressed member 334 fixed at the lower portion of the lengthwise-direction driving frame 301 by screws 334a and 334b.

First coil springs 391 are disposed close to the side end of the frame 301, on a side of the first and second objective lenses 21 and 22 (see FIG. 1). Both ends of the first coil spring 391 are respectively hook-shaped. One end is hooked with a screw 392 which is engaged with a portion of he flange 1aclose to the upper side thereof, and another end is hooked with a screw 393 which is engaged with a portion of the frame 301 close to a lower side thereof. Namely, the first coil spring 391 urges the frame 301 in the direction y1. Accordingly, the bowl of the shaft 332 contacts the pressed member 334 at all times.

A lateral-direction actuator, generally indicated by reference 340, is placed at a portion close to the lower side of the driving frames 301 and 302, on a side of the first and second objective lenses 21 and 22 (see FIG. 1), being also disposed on a side of the first correction lens 31 viewed from a center axis of the frames 301 and 302 along the lengthwise direction. The lateral-direction actuator 340 comprises a stepping motor 341 and a shaft 342. The stepping motor 341 comprises a motor case 341a and a motor 341b, which is mounted in the motor case 341a.

The motor 341b can rotate in forward and reverse directions around a lateral direction axis. The shaft 342 is supported so as to be unitarily rotatable with the rotational movement of the motor 341b and movable along the longitudinal axis thereof. Threads are formed on the outer surface of the shaft 342, and the shaft 342 is engaged with a female thread (omitted in FIGS. 2 and 4) formed on the inner surface of a quill of the motor case 341a. Namely, the shaft 342 rotatably extends or retracts in the longitudinal direction, in accordance with the rotational direction, forward and reverse, of the motor 341b. A bowl (not shown)is mounted on the tip of the shaft 342. The bowl of the shaft 342 abuts (but is not fixedly mounted to) a pressed member 344, the pressed member being affixed to the lower portion of the lateral-direction driving frame 302 by screws 344a and 344b.

A flange 341c, generally lozenge-shaped, is unitarily formed at one end of the motor case 341a of the stepping motor 341. The flange 341c is held on a fixing member 343 by a screw 343a and a screw 343b which is placed at the opposite side to the screw 343a with the motor case 341a therebetween. The fixing member 343 is securely fixed on the flange 1a. Namely, the motor case 341a is fixed to the flange 1a through the flange 341c and the fixing member 343.

Similarly, a flange 331c, generally lozenge-shaped, is unitarily formed at one end of the motor case 331a of the stepping motor 331. The flange 331c is held on a fixing member 333 by a screw 333a and a screw (omitted in FIGS. 2 and 4), which is placed at the opposite side to the screw 333a with respect to the motor case 331a. The fixing member 333 is securely fixed on the flange 1a. Namely, the motor case 331a is fixed to the flange 1a through the flange 331c and the fixing member 333.

A second coil spring 396 is disposed at the upper portion of the frame 301, on a side of the first and second objective lenses 21 and 22 (see FIG. 1). both ends of the second coil spring 396 are respectively hook-shaped. One end is hooked with a screw 397 which is engaged with a portion of the upper end of the frame 301, on the side at which the first correction lens 31 is placed. Another end is hooked with a hole 398c formed in a flange 398, which is fixed at a central portion of the frame 302, at the upper end thereof. Namely, the second coil spring 396 urges the frame 302 in the direction x1, thereby biasing the pressed member 344 against the bowl of the shaft 342.

When the motor 331b rotates in the forward direction, the shaft 332 rotatably extends in the direction y2 (the downward direction). The movement of the shaft 332 in the direction y2 is transmitted to the lengthwise-direction driving frame 301 through the pressed member 334. As described above, the frame 301 is slidably supported by the flange 1a, so that the frame 301 is driven in the direction y2, in accordance with the rotational movement of the motor 331b, resisting the spring force of the first coil springs 391 in the direction y1. On the other hand, when the motor 331b rotates in the reverse direction, the shaft 332 rotatably retracts in the direction y1 (the upward direction), so that the frame 301 is driven in the direction y1 by the spring force of the first coil springs 391 in the direction y1. The drive of the frame 301 in the directions y1 and y2 is respectively led by linear portions of the flange 1a, i.e. the inner walls 1L and 1R, and the holding members 310. During movement of the frame 301 in the y1–y2 direction, the pressed member 344 engages and is slidable with respect to the bowl of the shaft 342 in the y1–y2 direction.

When the motor 341b rotates in the forward direction, the shaft 342 rotatably extends in the direction x2 (the left direction in FIG. 2). The movement of the shaft 342 in the direction x2 is transmitted to the lateral-direction driving frame 302 through the pressed member 344. As described above, the frame 302 is slidably supported by the frame 301, so that the frame 302 is driven in the direction x2, in accordance with the rotational movement of the motor 341b, resisting the spring force of the second coil spring 396 in the direction x1. On the other hand, when the motor 341b rotates in the reverse direction, the shaft 342 rotatably retracts in the direction x1 (the right direction in FIG. 2), so that the frame 302 is driven in the direction x1 by the spring force of the second coil spring 396 in the direction x1. The drive of the frame 302 in the directions x1 and x2 is respectively led by linear portions of the opening of the frame 301, i.e. the inner walls 301U and 301B, and the holding members 320.

Figure 5:
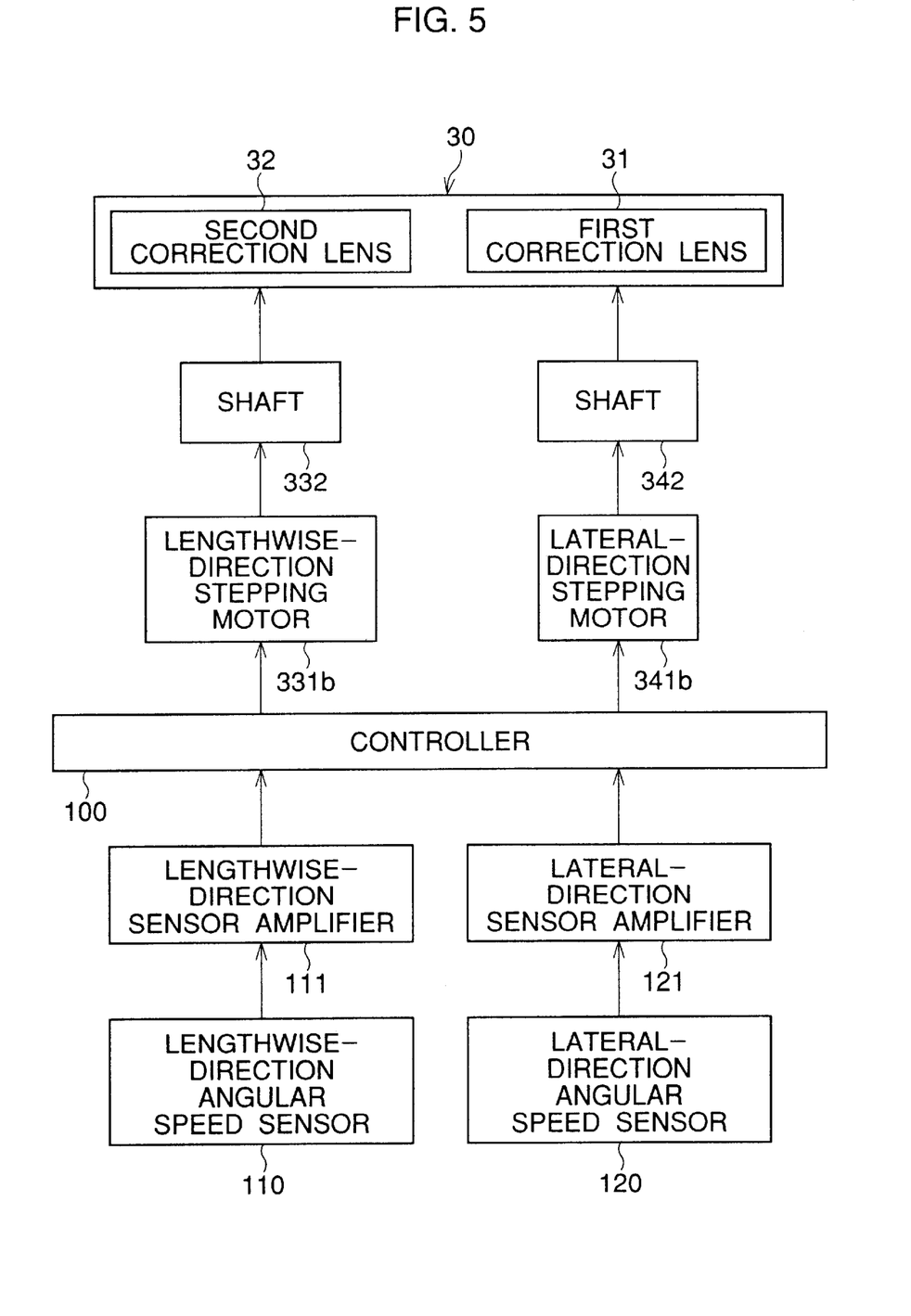
FIG. 5 is a block diagram of a tremble preventing apparatus of the first embodiment.

FIG. 5 is a block diagram of the tremble preventing device of the first embodiment. A lengthwise-direction angular speed sensor 110 detects a vector and an angular speed of a trembling in the lengthwise direction, and a lateral-direction angular speed sensor 120 detects a vector and an angular speed of a trembling in the lateral direction, while the binoculars are being held by a user.

A lengthwise-direction sensor amplifier 111 is connected to the angular speed sensor 110, amplifying the lengthwise-direction angular speed outputted from the angular speed sensor 110. The amplified lengthwise-direction angular speed, outputted from the sensor amplifier 111, is inputted to a controller 100. The controller 100 is, for example, a micro computer. Similarly, a lateral-direction sensor amplifier 121 is connected to the angular speed sensor 120, amplifying the lateral-direction angular speed outputted from the angular speed sensor 120. The amplified lateral-direction angular speed outputted from the sensor amplifier 121 is inputted to the controller 100.

In the controller 100, the lengthwise-direction angular speed and the lateral-direction angular speed are respectively converted to digital values, based on a predetermined synchronous signal. Each digital value is subjected to integration, so that a lengthwise-direction angular displacement signal and a lateral-direction angular displacement signal, respectively corresponding to an amount of hand trembling in each of the directions, are calculated. Based on the lengthwise-direction angular displacement signal, a lengthwise-direction driving amount of the lens supporting frame 30 in a plane perpendicular to the optical axes OP1 and OP2, i.e. a driving step number of the motor 331b of the lengthwise-direction actuator 330 (pulse number inputted to the motor 331b), is calculated. Similarly, based on the lateral-direction angular displacement signal, a lateral-direction driving amount of the lens supporting frame 30 in a plane, i.e. a driving step number of the motor 341b of the lateral-direction actuator 340, is calculated.

The motor 331b of the lengthwise-direction actuator 330 is rotated based on the pulse number outputted from the controller 100. The rotational motion of the motor 331b is transmitted to the lens supporting frame 30 through the shaft 332, so that the lens supporting frame 30 is moved in the lengthwise-direction. Similarly, the motor 341b of the lateral-direction actuator 340 is rotated based on the pulse number outputted from the controller 100. The rotational motion of the motor 341b is transmitted to the lens supporting frame 30 through the shaft 342, so that the lens supporting frame 30 is moved in the lateral-direction.

Figure 6:
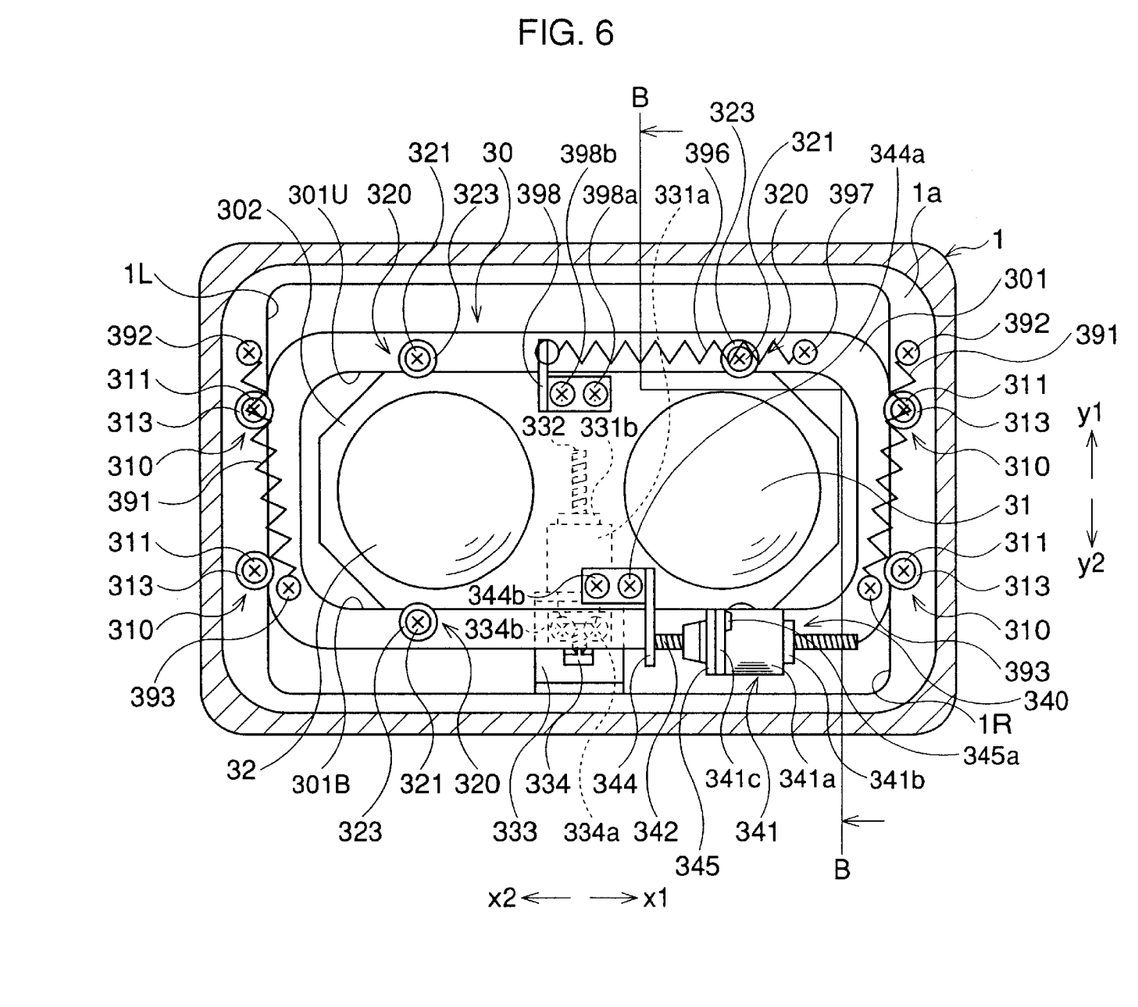
FIG. 6 is a front view of a lens supporting frame of a second embodiment.
Figure 7:
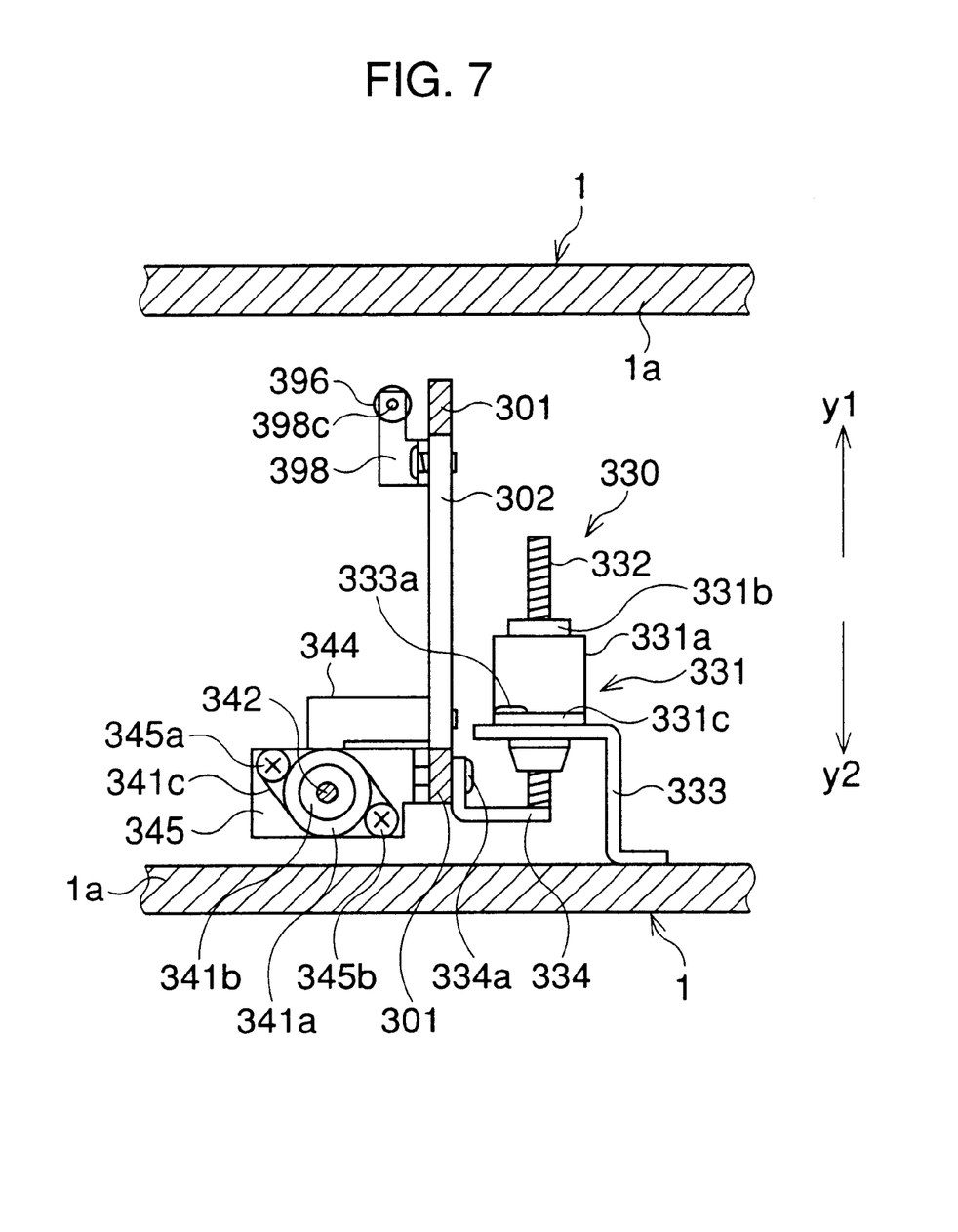
FIG. 7 is a sectional side view of the lens supporting frame of the second embodiment.

FIG. 6 is a front view of a tremble preventing apparatus, to which a second embodiment of the present invention is applied, viewed from the side of the first and second objective lenses 21 and 22. FIG. 7 is a sectional side view taken in the direction of the arrows substantially along the line B—B of FIG. 6. In FIGS. 6 and 7, components utilized in the first embodiment, which are identical in the second embodiment, share the same reference numerals.

Similarly to the first embodiment, the generally lozenge-shaped flange 341c is unitarily formed at one end of the motor case 341a of the stepping motor 341 of the lateral-direction actuator 340. The flange 341c is securely fixed on a fixing member 345 by screws 345a and 345b. The fixing member 345 is fixed on the lengthwise-direction driving frame 301. Namely, the motor case 341a is secured to the frame 301 by the flange 341c and the fixing member 345.

The constructions of the other portions are similar to those of the first embodiment. The shaft 332, of the stepping motor 331 of the lengthwise-direction actuator 330, rotatably extends and retracts along the longitudinal axis thereof, in accordance with the rotational directions, forward and reverse, of the motor 331b. The spring force of the first coil springs 391 urges the bowl of the shaft 332 against the pressed member 334, which is fixed at the lower portion of the frame 301, at all times. Also, the shaft 342, of the stepping motor 341 of the lateral-direction actuator 340, rotatably extends and retracts along the longitudinal axis thereof, in accordance with the rotational directions, forward and reverse, of the motor 341*b*. The spring force of the second coil spring 396 urges the bowl of the shaft 342 against the pressed member 344, which is fixed at the lower portion of the frame 302, at all times. The frame 301 is driven in the directions y2 and y1 in accordance with the rotational movement of the motor 331*b*. The frame 302 is driven in the directions x2 and x1 in accordance with the rotational movement of the motor 341*b*.

Figure 8:
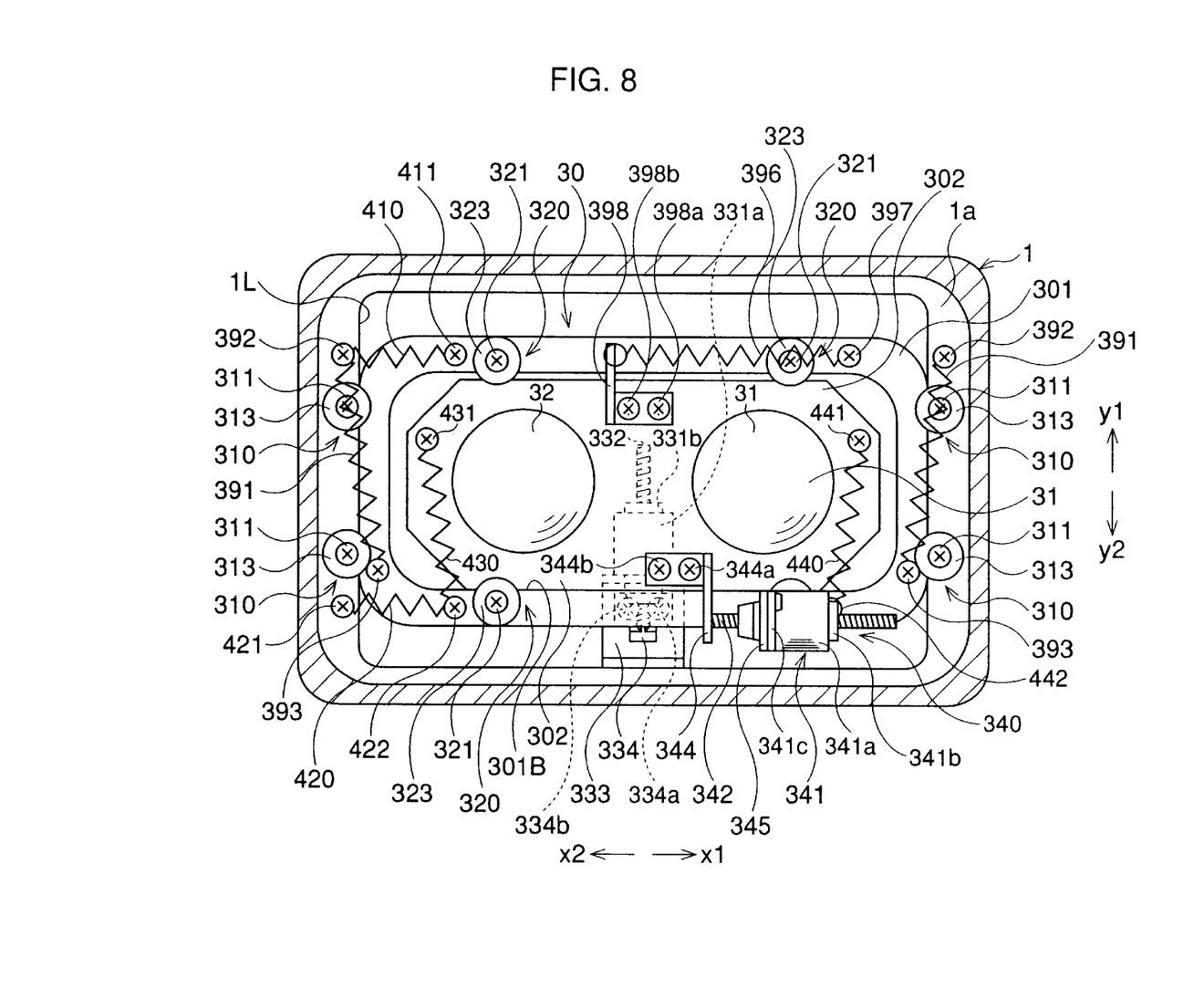
FIG. 8 is a front view of a lens supporting frame of a third embodiment.

FIG. 8 is a front view of a tremble preventing apparatus, to which a third embodiment of the present invention is applied, viewed from the side of the first and second objective lenses 21 and 22. In FIG. 8, components utilized in the third embodiment, which are identical in the second embodiment, share the same reference numerals.

Coil springs 410 and 420 are disposed at the upper and lower portions, respectively, of the left side of the frame 301 in FIG. 8. One end of the coil spring 410 is fixed on the flange 1*a* by the screw 392, and another end of the coil spring 410 is fixed on the frame 301 by a screw 411. One end of the coil spring 420 is fixed on the flange 1*a* by a screw 421, and another end of the coil spring 420 is fixed on the frame 301 by a screw 422. Namely, the coil springs 410 and 420 urge the frame 301 in the direction x2. Accordingly, the left side surface of the frame 301 is in contact with the inner wall 1L of the flange 1*a* at all times.

Coil springs 430 and 440 are disposed at a left side portion and a right side portion, respectively, of the frame 302. One end of the coil spring 430 is fixed on the frame 302 by a screw 431, and another end of the coil spring 430 is fixed on the frame 301 by the screw 422. One end of the coil spring 440 is fixed on the frame 302 by a screw 441, and another end of the coil spring 440 is fixed on the frame 301 by a screw 442. Namely, the coil springs 430 and 440 urge the frame 302 in the direction y2. Accordingly, the lower side surface of the frame 302 is in contact with the inner wall 301B of the opening of the frame 301 at all times.

Namely, in the third embodiment, the movements of the frame 301 in the directions y1 and y2 are led only by the inner wall 1L of the flange 1*a* at all times, and the movements of the frame 302 in the directions x1 and x2 are led only by the inner wall 301B of the opening of the frame 301 at all times.

As described above, according to the first, second and third embodiments, since the lengthwise-direction driving frame 301 and the lateral-direction driving frame 302 are united as the lens supporting frame 30, the driving mechanism of the correction lenses 31, 32, including the lengthwise-direction and lateral-direction actuators 330, 340, is one unit. Accordingly, mounting the driving mechanism in the binoculars is facilitated.

Further, as the frame 301 and the frame 302 are respectively made of the resin material, which has a low coefficient of friction, the drive of the frames 301 and 302 in the lengthwise and lateral directions is performed smoothly, being uneffected by friction between each member of the lens supporting frame 30. Accordingly the trembling correction operation is swift.

Furthermore, as the thickness of the flange 1*a* is larger than the thickness of the frame 301 along the optical axes OP1 and OP2, the drive of the frame 301 is performed smoothly, being unrestrained by the washers 313. Also, since the thickness of the frame 301 is larger than the thickness of the frame 302 along the optical axes OP1 and OP2, the drive of the frame 302 is performed smoothly, being unrestrained by the washers 323. Accordingly, the trembling correction operation is swift.

Due to the difference between the thickness of the flange 1*a* and the thickness of the frame 301, along the optical axes OP1 and OP2, being small, such that the movement of the frame 301 along the optical axes OP1 and OP2 becomes negligible, and the difference between the thickness of the frame 301 and the thickness of the frame 302, along the optical axes OP1 and OP2, being small such that the movement of the frame 302 along the optical axes OP1 and OP2 becomes negligible, a defocusing of an image occurring due to movement of the correction lenses 21 and 22 deriving from movement of the frames 301 and 302 is avoided. According to the second embodiment, as the lateral-direction actuator 340 is fixed on the lengthwise-direction frame 301 by the fixing member 345, the pressed member 344 and the lateral-direction actuator 340 are moved together, in accordance with the drive of the frame 301 in the lengthwise direction. Therefore, it is avoided that the pressing force between the pressed member 344 and the shaft 342 restrains the lengthwise-direction movement of the frame 301, so that the trembling correction is accurately controlled and a durability of each member of the preventing device increases.

According to the third embodiment, the frame 301 is led only by the inner wall 1L at all times while being driven in the lengthwise direction, and the frame 302 is led only by the inner wall 301B while being driven in the lateral direction. Accordingly, with respect to forming the frame 301, it is only required that its width in the lateral direction is slightly shorter than the inner width of the flange 1*a* in the lateral direction. Similarly, with respect to forming the frame 302, it is only required that its width in the lengthwise direction is slightly shorter than the inner width of the opening of the frame 301, in the lengthwise direction. Namely, with respect to forming the flange 1*a*, the frames 301 and 302, a high tolerance is not required, so that simple manufacturing of these members is facilitated.

Note that, in the first, second and third embodiments, the flange 1*a* is unitarily formed on the inner wall 1 of the binoculars, however, an outer frame, being attachable to and removable from the body of the binoculars, can be mounted as member which holds the lengthwise-direction driving frame 301.

Further, in the first, second and third embodiments, the frame 301 is displaced in the flange 1*a*, and the frame 302 is displaced in the opening of the frame 301. However, a frame, which is driven in the lateral direction, can be displaced in the flange 1*a*, and a frame, driven in the lengthwise direction, which holds the correction lenses 31, 32, can be displaced within an opening of the frame driven in the lateral direction.

According to the present invention, the tremble correcting device can be miniaturized.

The present disclosure relates to subject matter contained in the following Japanese Patent Application No. 10-144386 (filed on May 26, 1998), which is expressly incorporated herein, by reference, in its entirety.

What is claimed is:

1. An optical device provided with a tremble preventing function comprising:
 a first driving frame in which an opening is formed, said first driving frame being slidably held by a fixing frame formed on an inner wall of said optical device;
 a second driving frame that holds correcting optical systems that correct a tremble of a focused image of said optical device, said second driving frame being slidably held in said opening;

a first driving mechanism that drives said first driving frame along a first axis on a plane vertical to an optical axis of said optical device; and a second driving mechanism that drives said second driving frame along a second axis perpendicular to said first axis on said plane.

2. The optical device of claim 1, wherein at least one portion of said fixing frame that contacts said first driving frame, has a linear portion parallel to said first axis;

at least one portion of said first driving frame that contacts said second driving frame has a linear portion parallel to said second axis;

said first driving frame is driven by said first driving mechanism, being led by said linear portion parallel to said first axis; and said second driving frame is driven by said second driving mechanism, being led by said linear portion parallel to said second axis.

3. The optical device of claim 2, wherein said first driving frame and said second driving frame are made of a resin material having a low coefficient of friction.

4. The optical device of claim 2, wherein said first driving mechanism and said second driving mechanism are fixed on said fixing frame.

5. The optical device of claim 2, wherein said first driving mechanism is fixed on said fixing frame, and said second driving mechanism is fixed on said first driving frame.

6. The optical device of claim 2, further comprising first urging members that urge said first driving frame such that said first driving frame contacts said linear portion parallel to said first axis at all times; and second urging members that urge said second driving frame such that said second driving frame contacts said linear portion parallel to said second axis at all times.

7. The optical device of claim 6, wherein said first urging members and said second urging members are coil springs.

8. The optical device of claim 2, further comprising first holding members and second holding members;

each of said first holding members including a first screw, a first nut and a first pair of washers, said first screw being received in said fixing frame along said optical axis, said first nut being threadingly engaged on a free end of said first screw, opposite a head of said first screw, a first washer of said first pair of washers being mounted between said head of said first screw and said fixing frame, and a second washer of said first pair of washers being mounted between said first nut and said fixing frame; and each of said second holding members including a second screw, a second nut and a second pair of washers, said second screw being received in said first driving frame along said optical axis, said second nut being threadingly engaged on a free end of said second screw, opposite a head of said second screw, a first washer of said second pair of washers being mounted between said head of said second screw and said first driving frame, and a second washer of said second pair of washers being mounted between said second nut and said first driving frame, wherein perimeters of said first pair of washers clamp perimeter portions of said first driving frame, so that said first driving frame is held by said fixing frame, with movement of said first driving frame along said optical axis being restrained, and perimeters of said second pair of washers clamp perimeter portions of said second driving frame, so that said second driving frame is held in said opening, with movement of said second driving frame along said optical axis being restrained.

9. The optical device of claim 8, wherein a thickness of said fixing frame along said optical axis is larger than a thickness of said first driving frame along said optical axis, and a thickness of said first driving frame along said optical axis is larger than a thickness of said second driving frame along said optical axis.

10. The optical device of claim 9, wherein a difference between said thickness of said fixing frame and said thickness of said first driving frame is small, such that a movement of said first driving frame along said first axis is unaffected by friction between said first pair of washers and said first driving frame, and said movement of said first driving frame along said optical axis is negligible, and a difference between said thickness of said first driving frame and said thickness of said second driving frame is small, such that a movement of said second driving frame along said second axis is unaffected by friction between said second pair of washers and said second driving frame, and said movement of said second driving frame along said optical axis is negligible.

11. The optical device of claim 1, wherein said fixing frame is a flange unitarily formed on said inner wall of said optical device.

12. An optical device provided with a tremble preventing function comprising:

a first driving frame in which an opening is formed, said first driving frame being slidably held by a fixing frame formed on an inner wall of said optical device;

a second driving frame that holds correcting optical systems for correcting a tremble of a focused image of said optical device, said second driving frame being slidably held in said opening; and a driving mechanism that independently drives each of said first driving frame and said second driving frame, wherein said fixing frame includes first leading members that lead said first driving frame in a first direction on a plane perpendicular to an optical axis of said optical device, and said first driving frame includes second leading members that lead said second driving frame in a second direction perpendicular to said first direction, on said plane.

13. The optical device of claim 12, wherein a thickness of said first driving frame along said optical axis is shorter than a thickness of said fixing frame along said optical axis;

said first leading members being disposed on planes that include both side surfaces of said fixing frame and are perpendicular to said optical axis, and each of said first leading members being disposed close to said first driving frame, such that one portion of each said first leading member overlaps said first driving frame.

14. The optical device of claim 13, wherein each of said first leading members includes a pair of washers, said pair of washers being disposed on said planes such that said fixing frame is partially interposed between said pair of washers and a portion of said pair of washers overlaps said first driving frame.

15. The optical device of claim 14, wherein a difference between said fixing frame and said first driving member is small, such that a movement of said first driving frame in said first direction is unaffected by friction between said pair of washers and said first driving frame, and a movement of said first driving frame along said optical axis is negligible.

16. The optical device of claim 12, wherein a thickness of said second driving frame along said optical axis is shorter than a thickness of said first driving frame along said optical axis;

said second leading members being disposed on planes that include both side surfaces of said first driving frame and are perpendicular to said optical axis, and each of said second leading members being disposed close to said opening, such that one portion of each said second leading member overlaps said opening.

17. The optical device of claim 16, wherein each of said second leading members includes a pair of washers, said pair of washers being disposed on said planes such that said first driving frame is partially interposed between said pair of washers and one portion of said pair of washers overlaps said opening.

18. The optical device of claim 17, wherein a difference between said thickness of said first driving frame and said thickness of said second driving frame is small, such that a movement of said second driving frame in said second direction is unaffected by friction between said pair of washers and said second driving frame, and a movement of said second driving frame along said optical axis is negligible.

\* \* \* \* \*